United States Patent [19]

Wolstenholme et al.

[11] Patent Number: 5,297,256
[45] Date of Patent: Mar. 22, 1994

[54] DIGITAL IMAGE PROCESSING SYSTEM AND METHOD

[75] Inventors: Arthur T. Wolstenholme, Peterborough; Robert F. Burton, Lincs; Ignazio Barraco, Peterborough; Eddie Kin Kwok Chu, Leighton, all of United Kingdom

[73] Assignee: Crosfield Electronics (USA) Limited, Burlington Gardens, London, United Kingdom

[21] Appl. No.: 681,638

[22] Filed: Apr. 4, 1991

Related U.S. Application Data

[63] Continuation of Ser. No. 30,642, Mar. 27, 1987, abandoned.

[30] Foreign Application Priority Data

Apr. 7, 1986 [GB] United Kingdom ............... 8608431

[51] Int. Cl.⁵ ................................................. G06F 15/20
[52] U.S. Cl. ................................. 395/162; 395/575; 364/188; 371/68.2
[58] Field of Search ........................... 358/404–406, 358/408; 371/67.1, 68.1, 68.2, 68.3; 395/162–164, 575, 200; 364/188

[56] References Cited

U.S. PATENT DOCUMENTS

| | | | |
|---|---|---|---|
| 3,598,910 | 8/1971 | Johnston et al. | 358/406 |
| 3,749,829 | 7/1973 | Burns et al. | 358/136 |
| 4,308,615 | 12/1981 | Koegel et al. | 364/900 X |
| 4,424,576 | 1/1984 | Lange et al. | 364/900 |
| 4,434,489 | 2/1984 | Blyth | 371/29 |
| 4,456,994 | 6/1984 | Segarra | 371/16 |
| 4,471,348 | 9/1984 | London et al. | |
| 4,545,013 | 10/1985 | Lyon et al. | 364/200 |
| 4,553,201 | 11/1985 | Pollack, Jr. | 364/200 |
| 4,569,049 | 2/1986 | McNamara | 371/25 |
| 4,581,738 | 4/1986 | Miller et al. | 371/18 |
| 4,654,852 | 3/1987 | Bentley et al. | 371/29 |
| 4,665,501 | 5/1987 | Saldin et al. | 364/900 |
| 4,701,845 | 10/1987 | Andreasen et al. | 364/200 |
| 4,713,758 | 12/1987 | De Kelaita et al. | 364/200 |
| 4,764,870 | 8/1988 | Haskin | 364/415 |
| 4,803,039 | 2/1989 | Impink, Jr. et al. | 364/188 X |

FOREIGN PATENT DOCUMENTS

| | | | |
|---|---|---|---|
| 0159158 | 10/1985 | European Pat. Off. | H04N 1/32 |
| 58-3460 | 1/1983 | Japan | H04N 1/00 |
| 58-3466 | 1/1983 | Japan | H04N 1/00 |
| 58-3467 | 1/1983 | Japan | H04N 1/00 |

OTHER PUBLICATIONS

Black, U. D., Data Communications, Networks, and Distributed Processing, Reston Publishing Company, Inc., 1983, pp. 185–187.

*Primary Examiner*—Dale M. Shaw
*Assistant Examiner*—Kee M. Tung
*Attorney, Agent, or Firm*—Sughrue, Mion, Zinn, Macpeak & Seas

[57] ABSTRACT

A digital image processing system comprises a processor at a central, first site; and digital image processing equipment such as an analyze scanner and an expose scanner at a second site remote from the first site. The processor and the digital image processing equipment are connectable and are adapted to pass signals therebetween corresponding to signals generated by the digital image processing equipment. These signals may be representative of operator commands or digital data generated at the second site which can be monitored at the first site.

2 Claims, 4 Drawing Sheets

DIGITAL IMAGE PROCESSING SYSTEM AND METHOD

This is a continuation of application Ser. No. 07/030,642 filed Mar. 27, 1987 now abandoned.

FIELD OF THE INVENTION

The invention relates to digital image processing systems and methods of monitoring digital image processing equipment.

DESCRIPTION OF THE PRIOR ART

In the last few years, high technology digital image processing equipment has been developed. Such equipment includes digital input scanners for scanning a transparency or the like to generate digital data representing the pixel content of that transparency, digital output scanners for exposing a record medium to an exposing beam such as a laser beam controlled in response to digital data representing the pixel content of the output image, and digital image modification systems enabling scanned images to be retouched and modified as well as enabling pages to be composed. For example, we manufacture the Magnascan series of input and output scanners together with our Studio 800 series for modifying scanned images.

Although all this equipment has been designed to be relatively straight forward for an operator to use, there are occasions when an operator wishes to execute an unusual operation where he may make a mistake and not understand or realize the mistake he is making. In addition, the complex equipment, primarily the mechanical parts of the equipment, may suffer breakdown or wear leading to inaccuracies in operation of the equipment. Also, the software for controlling a computer within the equipment may need to be updated.

In the past, these problems have necessitated the operator contacting a skilled engineer who must then travel to the site of the image processing equipment to analyse the problem and then propose a solution. This is time consuming and expensive and with the increasing popularity of digital image processing equipment sited at widely spaced positions around the country, it is necessary to employ a relatively large number of engineers close to these sites in order to provide an efficient back-up service.

JP-A-583466 discloses a monitoring system for monitoring data transferred between a pair of transmission systems.

EP-A-0159158 discloses a facsimile system having a local host processor system for controlling a facsimile unit.

The use of either of these proposals with digital image processing equipment would require the siting of the system locally with the equipment.

SUMMARY OF THE INVENTION

In accordance with one aspect of the present invention, a digital image processing system comprises processing means at a first site; and digital image processing equipment at a second site remote from the first site, the processing means and the digital image processing equipment being connectable and being adapted to pass signals therebetween corresponding to signals generated by the digital image processing equipment.

This system enables a variety of monitoring and/or control processes to be achieved from the first site. This means that an engineer may be located at a central site and be responsible for a large number of widely separated sets of digital image processing equipment at a plurality of second sites.

In some cases, the processing means at the first site may be adapted simply to receive signals from the digital image processing equipment at the second site. Preferably, however, the processing means and the digital image processing equipment are adapted to pass signals in both directions therebetween. This latter arrangement enables the engineer at the first site not only to monitor the action taken at the second site but also to control directly the digital image processing equipment.

In one arrangement, the system further comprises storage means for storing a history of the operator commands generated at the second site. This enables the engineer at the first site to monitor the sequence of commands issued at the second site in order to check that the equipment is being instructed correctly by the operator. In order to reduce communication time, the storage means is preferably sited at the second site. In addition, or alternatively, the processing means can monitor operator commands generated at the second site in real time as these commands are generated.

The signals passed to the first site from the second site may be representative of operator commands generated at the second site, digital data generated by the image processing equipment, for example as a result of scanning an image, power supply voltages, laser power and current, input optical and electronic calibration parameters and the like.

In a preferred arrangement, the digital image processing equipment includes a monitoring system including a processor responsive to a program stored within the monitoring system, the processing means being adapted to modify the stored program. Conveniently, in this case, the program which can be modified is stored in electrically erasable programmable read only memory (EEPROM) while the software enabling this reprogramming to be achieved is itself stored in non-alterable EPROM.

It should be understood that the processing means at the first site includes at least logic circuitry and preferably a microprocessor and is not simply a slave terminal for connection with the digital image processing equipment.

The connection between the two sites may be a permanent hard wired connection or could be provided on an intermittent basis via, for example, the public switched telephone network.

In accordance with a second aspect of the present invention, a method of monitoring at a first site digital image processing equipment at a second site remote from the first site, the digital image processing equipment being responsive to operator commands at the second site to generate digital image data, comprises storing a history of operator commands and/or digital data generated by the digital image processing equipment; and displaying all or part of the history at the first site.

This aspect of the invention deals with one of the problems set out above where a relatively inexperienced operator is incorrectly operating the equipment. Furthermore, it does not require an engineer to travel to the remote second site since instead he can remain at the first, central site and monitor the remote equipment. In addition, by positioning the engineer at the first site he can monitor equipment at a number of second sites which may be widely spaced apart from each other and from the central site.

Preferably, the step of storing a history of the operator commands and/or digital data is carried out at the second site, the history being transmitted to the first site in response to a suitable command. For example, when a problem is encountered, the engineer at the first site could issue a command to the remote equipment via a communications link to be described below causing the remote equipment to transmit the history of commands or digital data.

The digital image processing equipment at the second site may include a store, such as a RAM; and means for detecting operator commands and/or digital data and causing the store to store corresponding representations.

Preferably, only a recent history of operator commands and/or digital data is stored, for example the most recent 100 commands or the commands issued in the most recent two hour period. In this case, the store could comprise a first in-first out store.

In accordance with a third aspect of the present invention, a method of monitoring at a first site digital image processing equipment at a second site remote from the first site comprises transmitting to the first site a signal representative of one or more of the operator commands and data generated by the equipment as the commands or data is generated at the second site; and monitoring at the first site the transmitted signals.

This method enables the operation of the equipment to be monitored at the first site in real time. It also enables two types of diagnostic information to be obtained. Firstly, the engineer at the first site is able to determine whether an operator is issuing an incorrect series of commands and secondly he is able, in conjunction with the operator at the remote, second site, to determine whether there is a fault with the image processing equipment in that it responds incorrectly to particular commands. Thus, having ascertained that a correct series of commands have been issued, the engineer can communicate with the operator to assess what actions the equipment is taking in response to those commands. The communication can be by voice, or could be a message transmitted from the first site to the second site and displayed by the image processing equipment.

In accordance with a fourth aspect of the present invention, a method of monitoring at a first site digital image input scanning equipment at a second site remote from the first site comprises causing the input scanning equipment to scan a line of an image whose pixel content is already known to generate scanned digital data; transmitting information related to the scanned digital data to the first site; and comparing the transmitted information with expected information to monitor for any errors in the scanned line.

The line of known characteristics may be taken from a standard vignette or grey scale which will be fitted by the operator at the second site to the input scanner.

Preferably, this method further comprises comparing, at the second site, the scanned digital data with one or more thresholds and transmitting to the first site only information relating to excursions of the data outside the or each threshold. This is particularly useful where a large number of pixels in a scan line are concerned. For example, a single line of an A4 page may comprise 16000 pixels requiring up to ten minutes to transmit the scanned digital data between the two sites. By comparing the scanned line with preferably two thresholds, it is possible only to send information relating to excursions of the scanned data outside the band defined by the thresholds. This will indicate the errors which the operator had detected or wishes to correct.

Conveniently, the known image line is repeatedly scanned so that random deviations in the scanned pixel content can be eliminated.

Communication between the sites may be achieved in any conventional manner by for example a fixed link or a radio link. However, it is preferable if communication is achieved using the public switched telephone network, the equipment at both sites being provided with conventional modems or similar equipment.

BRIEF DESCRIPTION OF THE DRAWINGS

An example of a system and examples of methods for operating the system in accordance with the present invention will now be described with reference to the accompanying drawings, in which.

DETAILED DESCRIPTION OF THE PREFERRED EMBODIMENTS

Figure 1:
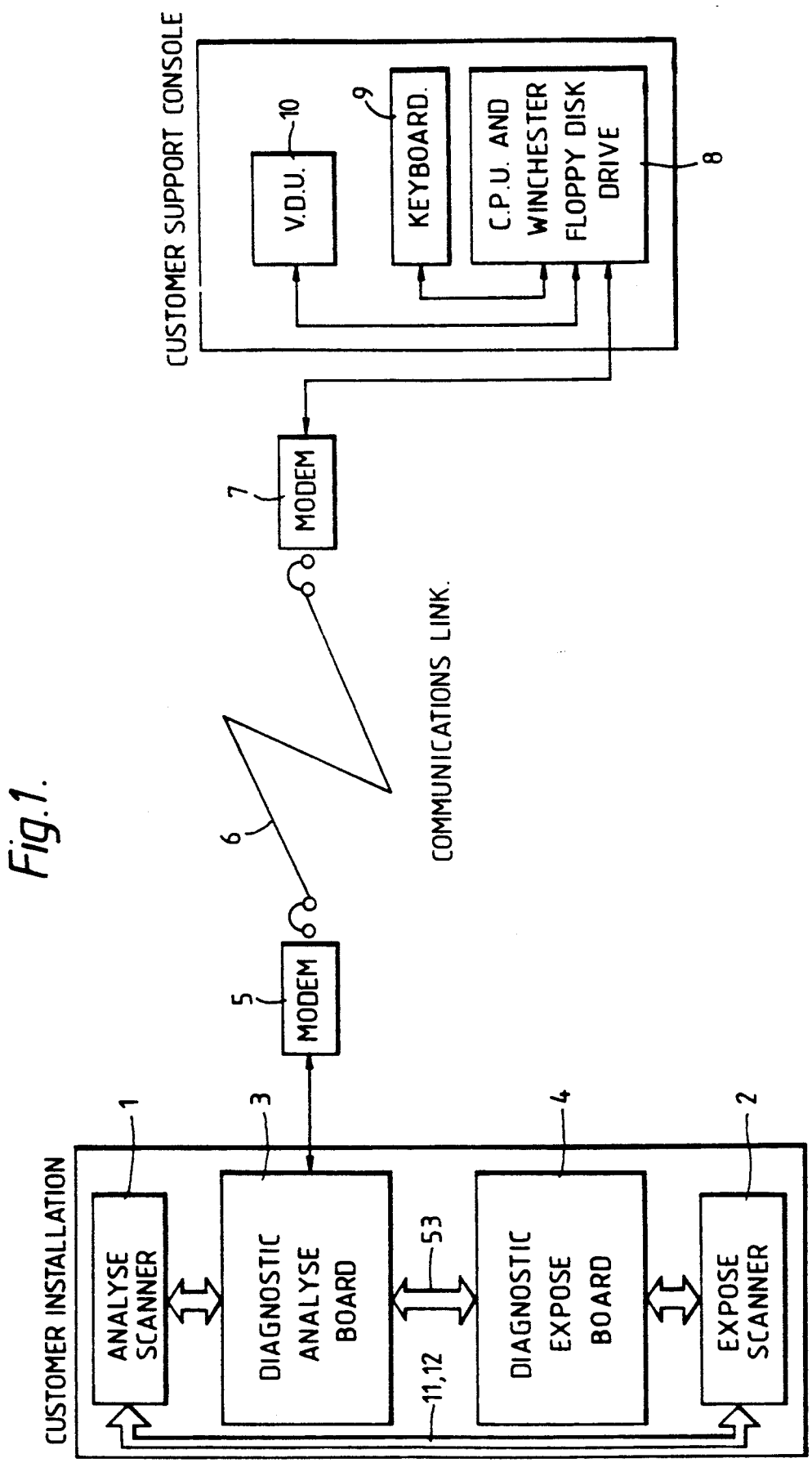
FIG. 1 is a block diagram illustrating schematically the equipment at each site.

The customer installation comprises a conventional analyse scanner 1 for scanning original transparencies and generating digital data defining the colour content of pixels of the transparencies and a conventional expose scanner 2 responsive to digital data to control the exposure of a record medium to an exposing laser beam. Typical scanners 1, 2 are those manufactured by Crosfield Electronics Ltd under the tradename Magnascan. The analyse scanner 1 is connected to a diagnostic analyse printed circuit board 3 while the expose scanner is connected to a diagnostic expose printed circuit board 4. The circuit board 3 is connected directly to a modem 5 while the circuit board 4 is connected to the modem 5 via the circuit board 3. The scanners are connected directly to one another for the transfer of digital image data and control data by respective buses 11, 12 (shown as one bus in FIG. 1).

The modem 5 is connected to a conventional telephone line 6 which connects with a modem 7 at a central customer support site remote from the customer installation when dialled from the central support site. The support site includes a central processing unit 8 connected to the modem 7, a keyboard 9 similar to the keyboards included in the analyse and expose scanners 1, 2 and a monitor 10.

Figure 2:
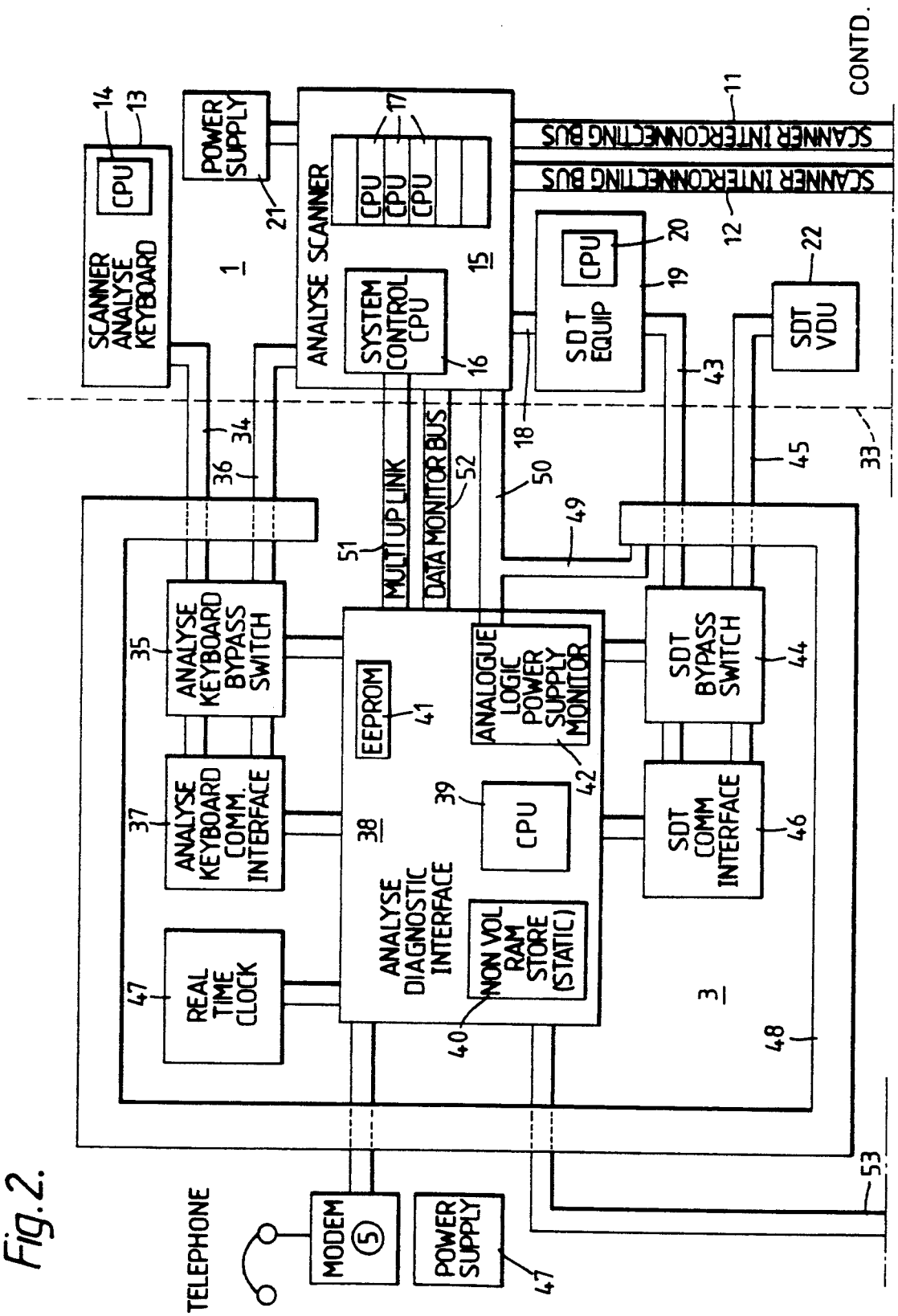
FIG. 2 is a block diagram illustrating the equipment at the customer installation in more detail; and, FIG. 3 is a flow diagram illustrating one mode of operation.
Figure 2:
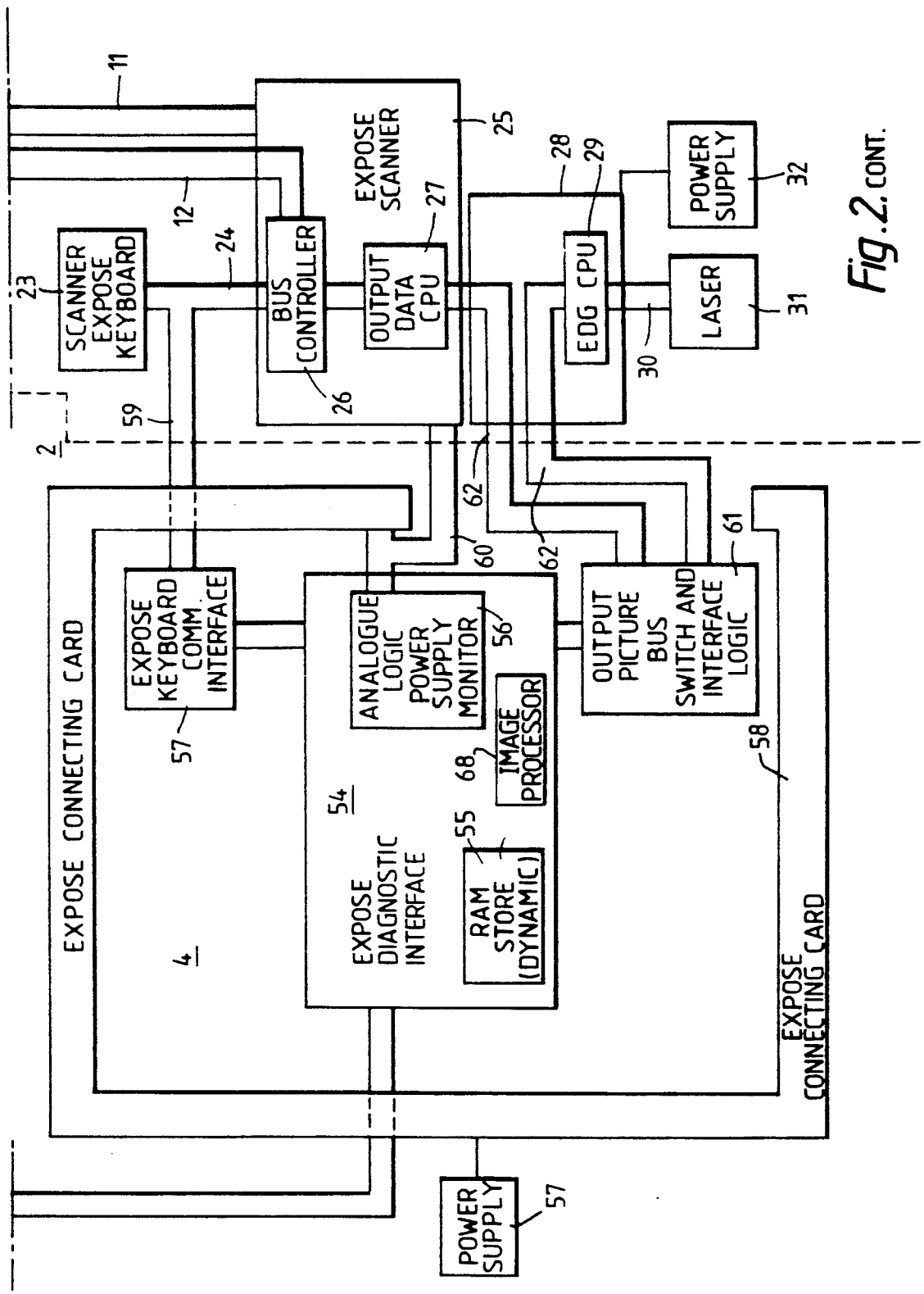

FIG. 2 illustrates the customer installation in more detail. The analyse scanner includes a keyboard 13 for controlling operation of the scanner, the keyboard incorporating a central processing unit (CPU) 14. The analyse scanner also includes a control system 15 including a system control CPU 16 and a number of additional CPUs 17, this system being connected via a bus 18 to a Scan Data Terminal (SDT) 19 incorporating a CPU 20. The SDT 19 allows the operator to control the storage on disc or the like of digital data generated by the analyse scanner. The analyse scanner is powered from a power supply 21.

The analyse scanner 1 also has a visual display unit (VDU) 22.

All the components so far described in connection with FIG. 2 are to be found in a conventional analyse scanner although in some cases the SDT 19 may not be included.

The expose scanner comprises a conventional expose control keyboard 23 coupled by a bus 24 to an expose scanner control system 25. The control system 25 includes a bus controller 26 coupled with the bus 24 and controlling communication with the analyse scanner 1 via the buses 11, 12 and an output data CPU 27.

In this example, the expose scanner 2 generates a half-tone dot representation of the original image and thus includes an electronic dot generator system 28 incorporating a CPU 29 and coupled via a bus 30 to a laser beam generator 31. The expose scanner is powered from a power supply 32.

All the components described in connection with FIG. 2 as forming part of the expose scanner are to be found in a conventional expose scanner.

It will be noted that all the elements to the right of the dashed line 33 define a conventional scanner system. The difference between this system and a conventional system is the inclusion of diagnostic analyse boards in the input scanner and the output scanner as illustrated in detail on the left of the dashed line 33.

Thus, instead of the analyse keyboard 13 being connected directly to the analyse scanner control system 15, the output bus 34 from the keyboard 13 is connected to an analyse keyboard bypass switch 35 mounted on the diagnostic analyse board 3. The switch 35 can either cause signals from the keyboard 13 to be switched directly out along a bus 36 to the analyse scanner control system 15 (in order to simulate a conventional system) or, in an open position, can cause signals from the keyboard 13 to be passed to a communications interface circuit 37 where they are fed to an analyse diagnostic control system 38. The control system 38 includes a CPU 39, a non-voltatile RAM store 40, an EEPROM 41, and an analog logic power supply monitor circuit 42.

The SDT 19 is coupled via a bus 43 with an SDT bypass switch 44 which has a similar function to the switch 35 so that in its closed or bypass state signals from the SDT 19 are fed directly via bus 43, switch 44 and a bus 45 to the VDU 22, while in an open state these signals are fed to the communications interface 46. A real time clock 47 is provided to control the CPU 39.

The CPU 39 is responsive to a program stored in the memory 41 and instructions received from the customer support site to carry out a number of diagnostic operations on data supplied via the communications interfaces 37, 46 as will be described below. The diagnostic analyse board 3 is powered from a power supply 47 which is coupled with the diagnostic analyse board via a connector 48.

The power supply monitor 42 monitors via a bus 49 the power supply to the analyse board itself and via a bus 50 the power supplied to the analyse scanner control system 15. The CPU 39 is responsive to the output from the monitor 42 to generate signals indicating the state of the power supply.

A pair of buses 51, 52 are provided between the analyse board 3 and the analyse scanner control system 15 to enable data generated by the control system 15 to be monitored by the CPU 39.

The analyse diagnostic system 38 is coupled with an expose diagnostic system 54 via a two way communication bus 53. The system 54 mounted on the diagnostic expose board 4 includes a dynamic RAM store 55, an analog logic power supply monitor 56 and an image processor 68. The diagnostic expose board 4 is powered from a power supply 57 via a connector 58.

The diagnostic expose board 4 also includes a communications interface circuit 57 coupled via a bus 59 with the keyboard 23 so as to pass signals from the keyboard 23 to the expose diagnostic control system 54. The power supply monitor 56 is coupled via a bus 60 with the connector 58 and the expose scanner control system 25 so as to monitor the power supply to each of these components. The monitor 56 provides corresponding output signals which may be stored in the store 55 or passed along the bus 53 to the analyse diagnostic control system 38.

The diagnostic expose board 4 also includes an output picture bus and interface logic circuit 61 inserted into the bus 62 between the expose scanner control system 25 and the EDG control system 28. This switch 61 in a closed state causes data to pass directly along the bus 62 from the control system 25 to the control system 28 but in an open state causes the data from the system 25 to pass to the diagnostic control system 54.

The insertion of the boards 3, 4 into the conventional analyse and expose scanners 1, 2 enables operator commands and internally generated scanner signals including digital data representing images to be monitored and, if desired, transferred along the telephone link 6 to the central site.

During normal operation, each of the switches 35, 44, 61 is set to its bypass state so that data passes directly through the switch and bypasses the diagnostic boards 3, 4. However, these switches are arranged such that the data can be monitored and a representation of that data can be stored in the respective stores 40, 55. In addition, signals from the monitors 42, 56 can be stored in these stores.

On deciding that a fault condition exists with his scanner, the operator will contact the remote site and the engineer at the remote site will then arrange for a direct connection to be set up between the CPU 8 and the diagnostic analyse printed circuit board 3 of the operator's equipment. The engineer can then carry out a number of different operations to locate and deal with any possible fault. Some examples of these modes or operations are described below.

1. Monitor Mode

This mode has two facilities:

a) Tracking operator's commands b) Tracking the scanners' response to those commands.

a) After initial investigation of the fault by voice communication with the customer both engineer at the Customer Support Console and the operator at the Customer Installation will either switch their respective modems from voice to data or arrange a redialled connection to the two modems 5, 7. The engineer then causes the CPU 39 to activate part of its diagnostic programme stored in the memory 41 so as to open the switch 35. This causes operator signals from the keyboard 13 to be passed to the control system 38 which causes a representation of those signals to be passed to the modem 5 and at the same time switches the signals back through the switch 35 to the analyse scanner control system 15 along the bus 36. In a similar manner signals from the SDT 19 or from the keyboard 33 can be passed to the engineer.

The commands will be repeated at the Customer Support Console in real time thus, operators attempting to enter illegal sequences may be discovered.

When the error is found a correction message can be displayed on the scanner display 22 and keyboard 13 or a message for the operator to return his modem to voice, upon which a more comprehensive explanation of the problem may be given by the engineer at the Customer Support Console.

b) When the scanner is set up correctly and set to operate, the engineer at the Customer Support Console can interrogate and monitor via the diagnostic board 4 various hardware and software elements of the scanner specified by the engineer or operator in order to ensure the correct response of the system to commands by the operator. This is achieved by causing the CPU to pass data along buses 51, 52 or bus 62 to the modem 5.

2. Remote Operations Mode

This mode enables the engineer at the Customer Support Console to take control of the scanner at the Customer Installation.

Using this mode, the engineer can inspect and modify any scanner or photographic parameters normally available to an operator through the analyse keyboard 13 by effectively substituting the keyboard 9. Once again the switch 35 is opened to remove the direct connection with the analyse control system 15 while the CPU 39 passes control signals from the keyboard 9 to the control system 15.

3. Trace Mode

This mode will operate continuously while the scanner is in normal operating mode (as mentioned above), storing each command and all relevant information on alpha-numeric display and seven segment display block relating to those individual commands. The commands and associated data are stored in part of the RAM 40 and RAM 55 such that at any time the commands and data held are the last X number of commands (e.g. 100) input to the scanner by the operator.

Should the operator perceive that a problem has occurred with his scanner he can instigate customer fault reporting, contact the service centre and the engineer can then download via the Communications Link, the entire contents of the Store 40 and inspect the validity of the commands.

Thus, if an operator has entered an illegal command or has mis-entered a command it can be detected. In this way Trace Mode checks the interface between operator and scanner.

The cause of intermittent errors can be quickly isolated in this way, particularly if the operator is the source of the problem.

4. Diagnostic Mode

In this mode the engineer at the Customer Support Console, takes control of the Customer's scanner as in Remote Operations Mode and can, if required, download from the customers support console, via the communications link 6 to the Customer Installation one or a suite of boardwise diagnostic programmes.

Results of diagnostics may be sent via the communications link to the Customer Support Console immediately when available if the Communications Link is made or stored until the Communications Link is made again.

5. Periodic Maintenance Mode

At times of convenience to the customer, the engineer at the Customer Support Console can take control of the Customer Installation in order to make a periodic check of some of the scanner vital signs such as scanner voltages as monitored by the monitors 42, 56, laser current, electronic calibration checks and the like.

6. Picture Transfer Mode

Figure 3:
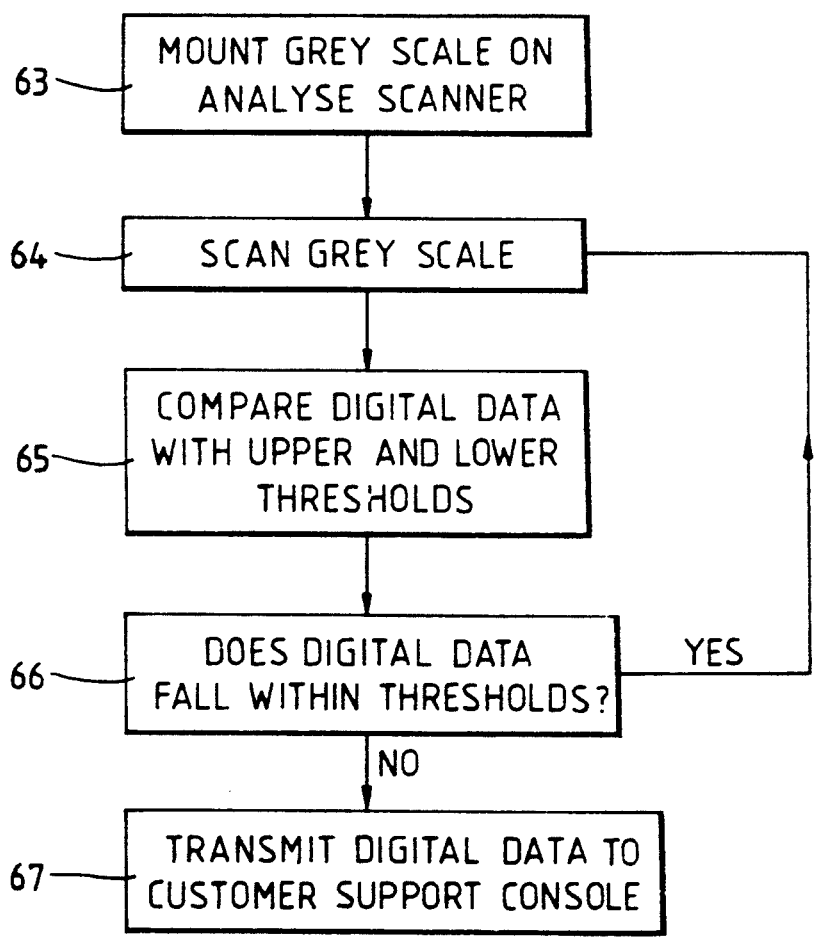

In this mode (FIG. 3), the operator mounts 63 a standard picture such as a grey scale on the cylinder of the analyse scanner 1 (not shown). The scanner is then set up to scan repeatedly 64 a single line of this grey scale. The first scan line is stored in the image processor 68 and transmitted to the customer support console for display on the VDU 10. Digital data from subsequent scans of the grey scale is fed to the control system 54 via the bus 62 and switch 61 which is open and compared 65,66 by the image processor 68 with a pair of thresholds previously determined and related to the first, stored scan line and which define a band within which it is expected that the digital data generated by the scanner should fall. The grey scale or picture test pattern is reconsituted together with the errors and is converted into a form such that the representation is displayed on the VDU 10 at the Central Support Console. This method of sending only errors with a programmable threshold allows the reconstitution of the grey scale, given not too many errors, to effectively run in "real time" at the Central site enabling the engineer to decide the best course of action to resolve the problem.

7. Software Update Mode

In this mode, the engineer downloads from the Customer Support Console new software for the CPU 39 to allow new diagnostic procedures to be incorporated. Typically this software will first be loaded into part of the RAM 40 and then transferred to the EEPROM 41.

We claim:

1. A method of monitoring at a first site digital image input scanning equipment at a second site remote from said first site to determine whether said digital image input scanning equipment is properly functioning, said method comprising causing from said first site said input scanning equipment at said second site to scan a line of an image whose pixel content is already know at said first site to generate scanned digital data; transmitting information related to said scanned digital data to said first site; and comparing said transmitted information with expected information stored at said first site that is related to said known pixel content to detect any errors in said scanned line caused by failure of said digital image input scanning equipment.

2. A method of monitoring at a first site digital image input scanning equipment at a second site remote from said first site to determine whether said digital image input scanning equipment is properly functioning, said method comprising:
(a) causing from said first site said input scanning equipment at said second site to scan a line of an image whose pixel content is already known at said first site to generate scanned digital data;
(b) transmitting information related to said scanned digital data to said first site;
(c) comparing said transmitted information with expected information stored at said first site which is related to said known pixel content to detect any errors in said scanned line arising from operation of said input scanning equipment;
(d) repeating steps (a)–(c) for each line of said image; and
(e) comparing the errors monitored in each said step (c) so as to enable random errors to be eliminated.

* * * * *